(12) United States Patent (10) Patent No.: US 8,676,138 B2
Wu (45) Date of Patent: Mar. 18, 2014

(54) METHOD OF HANDLING SYSTEM INFORMATION RECEPTION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 120 days.

(21) Appl. No.: 13/089,271

(22) Filed: Apr. 18, 2011

(65) Prior Publication Data

US 2011/0256858 A1  Oct. 20, 2011

Related U.S. Application Data

(60) Provisional application No. 61/325,800, filed on Apr. 19, 2010, provisional application No. 61/325,821, filed on Apr. 20, 2010, provisional application No. 61/331,838, filed on May 6, 2010.

(51) Int. Cl.
*H04B 1/04* (2006.01)
*H04B 7/14* (2006.01)
*H04W 4/00* (2009.01)
*H04W 36/00* (2009.01)
*H04W 40/00* (2009.01)
*H04W 68/00* (2009.01)
*H04B 7/00* (2006.01)
*H04M 1/00* (2006.01)
*H04J 1/16* (2006.01)
*H04L 12/28* (2006.01)
*H04L 12/16* (2006.01)

(52) U.S. Cl.
USPC ....... 455/104; 455/17; 455/67.11; 455/422.1; 455/435.3; 455/435.1; 455/437; 455/445; 455/458; 455/502; 455/552.1; 370/235; 370/255; 370/270; 370/277; 370/312; 370/350; 370/281; 370/311

(58) Field of Classification Search
USPC ............. 455/434, 418, 17, 67.11, 104, 422.1, 455/435.3, 435.1, 437, 445, 458, 502, 455/552.1; 370/312, 328, 235, 255, 270, 370/277, 350, 281, 311
See application file for complete search history.

(56) References Cited

U.S. PATENT DOCUMENTS 7,499,455 B2   3/2009  Lee
2003/0088695 A1*  5/2003  Kwak et al. ............... 709/238
(Continued)

FOREIGN PATENT DOCUMENTS

CN         1922803 A      2/2007
KR     1020110113897 A   10/2011
WO       2006118158 A1  11/2006

OTHER PUBLICATIONS

Huawei:: "Dedicated signaling for CC addition and SI change", 3GPP Draft; R2-102172 Dedicated Signaling for CC Addition and SI Change, 3rd Generation Partnership Project (3GPP), Mobile Competence Centre; 650, Route Des Lucioles; F-06921 Sophia-Antipolis Cedex; France, vol. RAN WG2, no. Beijing, china; 20100412, Apr. 6, 2010, XP0.*

(Continued)

*Primary Examiner* — Inder Mehra
(74) *Attorney, Agent, or Firm* — Winston Hsu; Scott Margo

(57) ABSTRACT

A method of handling system information reception for a mobile device capable of receiving and transmitting on a plurality of component carriers in a wireless communication system is disclosed. The method comprises receiving system information of a secondary component carrier of the plurality of component carriers via a first dedicated signaling, and maintaining the system information of the secondary component carrier valid until an update of the system information of the secondary component carrier is received via a second dedicated signaling.

13 Claims, 9 Drawing Sheets

(56) References Cited

U.S. PATENT DOCUMENTS

| | | | |
|---|---|---|---|
| 2004/0103435 | A1 | 5/2004 | Yi |
| 2008/0020762 | A1 | 1/2008 | Fischer |
| 2011/0002281 | A1* | 1/2011 | Terry et al. ............... 370/329 |
| 2011/0201323 | A1* | 8/2011 | Wu et al. ................. 455/418 |
| 2011/0243066 | A1* | 10/2011 | Nayeb Nazar et al. ....... 370/328 |
| 2011/0249608 | A1* | 10/2011 | Fischer .................. 370/312 |
| 2013/0034087 | A1 | 2/2013 | Kwon |

OTHER PUBLICATIONS

Huawei: : "System information update in CA", Internet Article, Jan. 18, 2010, XP002648921, Valencia—Spain Retrieved from the Internet: URL:http://www.3gpp.org/ftp/tsg_ran/WG2_RL2/TSGR2_68bis/docs/ [retrieved on Jul. 7, 2011].*

Catt:: "PCC Change", 3GPP Draft; R2-102061,3rd Generation Partnership Project (3GPP), Mobile Competence Centre ; 650, Route Des Lucioles ; F-06921 Sophia-Antipolis Cedex ; France, vol. RAN WG2, no. Beijing, china; 20100412, Apr. 6, 2010, XP050422546, [retrieved on Apr. 6, 2010]).*

Qualcomm Incorporated: "System information delivery under carrier aggregation", 3GPP Draft; R2-100422;3rd Generation Partnership Project (3GPP), Mobile Competence Centre ; 650, Route Des Lucioles ; F-06921 Sophia-Antipolis Cedex ; France vol. RAN WG2, no. Valencia, Spain Jan. 12, 2010, pp. 1-4, Valenci.*

3GPP TS 36.331 V9.2.0 3rd Generation Partnership Project; Technical Specification Group Radio Access Network; Evolved Universal Terrestrial Radio Access (E-UTRA) Radio Resource Control (RRC); Protocol specification (Release 9), Mar. 2010.

3GPP TSG RAN WG2 #69 bis R2-10xxxx "Meeting notes", Apr. 16, 2010.

3GPP TSG-RAN WG2 Meeting #69 R2-101846 "Stage 2 description of Carrier Aggregation", Feb. 22, 2010.

European patent application No. 11003301.6, European Search Report mailing date: Jul. 25, 2011.

Huawei, "Dedicated signaling for CC addition and SI change", 3GPP TSG-RAN WG2 Meeting #69bis, R2-102172, Apr. 12-16, 2010, Beijing, China, XP050422582, p. 1-3.

Huawei, "System information update in CA", 3GPP TSG-RAN WG2 Meeting #68bis, R2-100497, Jan. 18-22, 2010, Valencia, SP, XP002648921, p. 1-3.

3GPP TS 36.331 V9.1.0 (Dec. 2009), "3rd Generation Partnership Project; Technical Specification Group Radio Access Network; Evolved Universal Terrestrial Radio Access (E-UTRA) Radio Resource Control (RRC); Protocol specification (Release 9)", XP050401822, p. 1-232.

ZTE, "Enhancement of SI updating for CA", 3GPP TSG RAN WG2 #69bis, R2-102179, Apr. 12-16, 2010, Beijing, China, XP050422589, p. 1-3.

Sony Corporation, "Optimization of System information handling in Carrier Aggregation", 3GPP TSG RAN WG2 #69bis, R2-102203, Apr. 12-16, 2010, Beijing, China, XP050422308, p. 1-3.

European patent application No. 11003301.6, European Search Report mailing date: Nov. 15, 2011.

Catt, "PCC Change", 3GPP TSG RAN WG2 Meeting #69bis, R2-102061, Apr. 12-16, 2010, Beijing, China, XP050422546, p. 1-5.

Qualcomm Incorporated, "System information delivery under carrier aggregation", 3GPP TSG RAN WG2 #68bis, R2-100422, Jan. 18-22, 2010, Valencia, Spain, XP002661980, p. 1-3.

Panasonic, "System information acquisition at the start of carrier aggregation", 3GPP TSG RAN WG2#67, R2-094186, Aug. 24-28, 2009, Shenzhen, China, XP050352470, p. 1-4.

Huawei, "Upon removing the special cell", 3GPP TSG-RAN WG2 meeting #68bis, R2-100286, Jan. 18-22, 2010, Valencia, SP, XP050421005, p. 1-5.

Huawei, Catt, System information update in CA, 3GPP TSG-RAN WG2 meeting #69, R2-101016, San Francisco, US, Feb. 22-Feb. 26, 2010, p. 1-p. 5.

Office action mailed on Jul. 23, 2012 for the Korean application No. 10-2011-0036100, filing date Apr. 19, 2011, pp. 1-4.

Office Action mailed on Jan. 29, 2013 for the Japanese Application No. 2011-093453, filing date Apr. 19, 2011, pp. 1-4.

Notice of allowance mailed on Jan. 31, 2013 for the Korean application No. 10-2011-0036100, filing date Apr. 19, 2011, pp. 1-2.

Office action mailed on Jul. 2, 2013 for the China application No. 201110098324.X, filing date Apr. 19, 2011, p. 1-6.

Office action mailed on Jul. 26, 2013 for the Taiwan application No. 100113524, filing date Apr. 19, 2011, p. 1-7.

* cited by examiner

METHOD OF HANDLING SYSTEM INFORMATION RECEPTION AND RELATED COMMUNICATION DEVICE

CROSS REFERENCE TO RELATED APPLICATIONS

This application claims the benefit of U.S. Provisional Application No. 61/325,800, filed on Apr. 19, 2010 and entitled "Method and Apparatus for managing system information reception in a wireless communication system," No. 61/325,821, filed on Apr. 20, 2010 and entitled "Method and Apparatus for managing system information reception in a wireless communication system," and No. 61/331,838, filed on May 6, 2010 and entitled "Method and Apparatus for managing system information reception in a wireless communication system," the contents of which are incorporated herein in their entirety.

BACKGROUND OF THE INVENTION

1. Field of the Invention

The application relates to a method utilized in a wireless communication and a communication device thereof, and more particularly, to a method of handling system information reception in a wireless communication system and a related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

In the LTE system, a UE applies system information acquisition procedure to acquire system information broadcasted by the E-UTRAN upon selecting (e.g. upon power on) and upon re-selecting a cell, after handover completion, after entering E-UTRA from another RAT, upon return from out of coverage, upon receiving a notification that the system information has changed, upon receiving an indication about the presence of an Earthquake and Tsunami Warning System (ETWS) notification, upon receiving an indication about the presence of a Commercial Mobile Alert System (CMAS) notification, etc. Note that, unless explicitly stated otherwise the system information acquisition procedure overwrites any stored system information.

On the other hand, a UE verifies that stored system information remains valid by checking "SystemInfoValueTag" included in "SystemInformationBlockType1". In a word, the UE considers previously stored system information to be invalid when "SystemInfoValueTag" in the "SystemInformationBlockType1" is different from the one of the stored system information, and thereby performs the system information acquisition procedure to reacquire system information. Additionally, the UE considers stored system information to be invalid after 3 hours from the moment that the system information was successfully confirmed as valid.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multipoint transmission/reception (COMP), uplink multiple input multiple output (MIMO), etc.

For bandwidth extension, carrier aggregation is introduced to the LTE-Advanced for extension to wider bandwidth, where two or more component carriers are aggregated, for supporting wider transmission bandwidths (for example up to 100 MHz) and for spectrum aggregation. According to carrier aggregation capability, multiple component carriers are aggregated into overall wider bandwidth, where the UE can establish multiple links corresponding to the multiple component carriers for simultaneously receiving and/or transmitting.

Moreover, component carriers can be classified into a primary component carrier (PCC) and a secondary component carrier (SCC). The PCC is always activated, whereas the SCC is activated or deactivated according to specific conditions (e.g. an amount of data for transmission). The term "activation" means that transmission or reception of traffic data is performed or traffic data is ready for its transmission or reception. On the other hand, the term "deactivation" means that transmission or reception of traffic data is not permitted. In the deactivation, measurement is made or minimum information can be transmitted or received. In addition, a component carrier set to a secondary component carrier can be changed to a primary component carrier.

Note that, in the LTE system, the system information reception/acquisition is defined for the UE having only one connection to a single cell with a single component carrier. However, in the LTE-Advanced system, there is no system information reception mechanism defined for the UE having additional connections to additional cells with different component carriers. The applicant notices that an UE under carrier aggregation may encounter system information reception problems as below based on a direct image on a basis of a combination of the prior art LTE and LTE-Advanced system.

Consider a scenario that the network (e.g. an eNB) provides system information of a secondary component carrier to the UE with a dedicated signaling when the secondary component carrier is configured to the UE. Thus, the UE does not receive the system information of the secondary component carrier from a broadcast signaling on the secondary component carrier. The UE maintains the system information of the secondary component carrier valid for 3 hours when the system information of the secondary component carrier is received, and considers that the system information of the secondary component carrier is invalid after three hours. The UE has no valid system information of the secondary component carrier after three hours, and does not know how to obtain it for updating the system information of the secondary component carrier.

In another scenario, the UE updates system information of a secondary component carrier via a dedicated signaling from the network. However, when the secondary component carrier is configured to be the primary component carrier, the UE does not know how to obtain the system information of the primary component carrier (namely the original secondary component carrier) for system information update.

SUMMARY OF THE INVENTION

The application discloses a method of handling system information reception in a wireless communication system and a related communication device in order to solve the abovementioned problems.

A method of handling system information reception for a mobile device capable of receiving and transmitting on a plurality of component carriers in a wireless communication system is disclosed. The method comprises receiving system information of a secondary component carrier of the plurality of component carriers via a first dedicated signaling, and maintaining the system information of the secondary component carrier valid until an update of the system information of the secondary component carrier is received via a second dedicated signaling.

A method of handling system information reception for a mobile device capable of receiving and transmitting on a plurality of component carriers in a wireless communication system is disclosed. The method comprises receiving system information of a secondary component carrier of the plurality of component carriers, and sending a message to indicate the network when an update of the system information of the secondary component carrier is not received within a valid period during which the mobile device determines that the received system information of the secondary component carrier is valid.

A method of handling system information reception for a mobile device capable of receiving and transmitting on a plurality of component carriers in a wireless communication system is disclosed. The method comprises receiving system information of a secondary component carrier of the plurality of component carriers, and when an update of the system information of the secondary component carrier is not received within a valid period during which the mobile device determines that the system information of the secondary component carrier is valid, receiving the update of the system information of the secondary component carrier via a broadcast signaling on the secondary component carrier.

A method of handling system information reception for a network in a wireless communication system comprising a mobile device capable of receiving and transmitting on a plurality of component carriers is disclosed. The method comprises transmitting system information of a secondary component carrier of the plurality of component carriers to the mobile device, and sending an update of the system information of the secondary component carrier within a valid period during which the mobile device determines that the system information of the secondary component carrier is valid, to the mobile device.

A method of handling system information reception for a network in a wireless communication system comprising a mobile device capable of receiving and transmitting on a plurality of component carriers is disclosed. The method comprises transmitting system information of a secondary component carrier of the plurality of component carriers to the mobile device, configuring a secondary component carrier of the plurality of component carriers to be a primary component carrier of the plurality of component carriers for the mobile device, and transmitting system information of the primary component carrier to the mobile device with a signaling dedicated for transmitting system information of the secondary component carrier.

A method of handling system information reception for a mobile device capable of receiving and transmitting on a plurality of component carriers in a wireless communication system is disclosed. The method comprises receiving system information of a secondary component carrier of the plurality of component carriers, being configured changing the secondary component carrier to be a primary component carrier of the plurality of component carriers, and receiving the system information of the secondary component carrier via a broadcast signaling in response to changing the secondary component carrier to be the primary component carrier.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
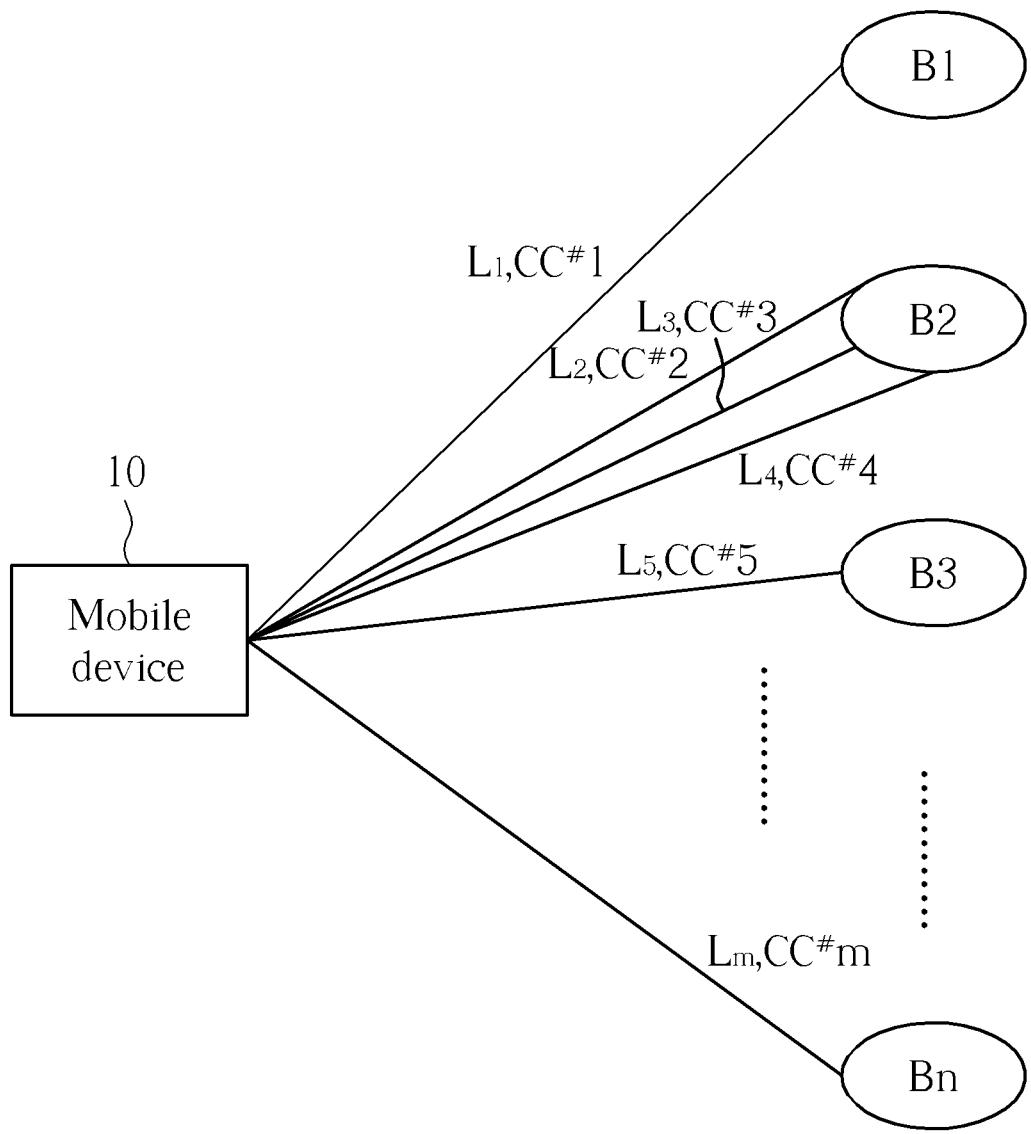
FIG. 1 is a schematic diagram of a wireless communication system.

Please refer to FIG. 1, which illustrates a schematic diagram of a wireless communication system featuring multiple connections between a mobile device 10 and base stations B1-Bn. The wireless communication system may be a LTE-Advanced system (i.e. an evolved universal terrestrial radio access network (E-UTRAN)) or any other similar network system (e.g. Worldwide Interoperability for Microwave Access (WiMAX)). The mobile device 10 can operate with carrier aggregation. In FIG. 1, the mobile device 10 communicates with the base stations B1-Bn through radio links $L_1$-$L_m$ that correspond to component carriers cc#1-cc#m configured in the mobile device 10 respectively. Each of the component carriers cc#1-cc#m corresponds to a radio frequency (RF) channel whose bandwidth may be varied according to different communication systems. In addition, the mobile device 10 is referred as an user equipment (UE) or a mobile station (MS), and can be a device such as a mobile phone, a computer system, etc.

Note that, the component carriers cc#1-cc#m are classified into a primary component carrier (PCC) and a secondary component carrier (SCC). The primary component carrier is constantly activated, whereas the secondary component carrier is activated or deactivated according to specific conditions (e.g. an amount of data for transmission). In addition, the mobile device 10 determines stored system information of a component carrier (e.g. the primary component carrier and/or the secondary component carrier) to be invalid after three hours. This shall be well known in the art, so the detailed description is omitted herein. In this specification, the term "valid period" is referred to the three hours valid time for the stored system information.

Figure 2:
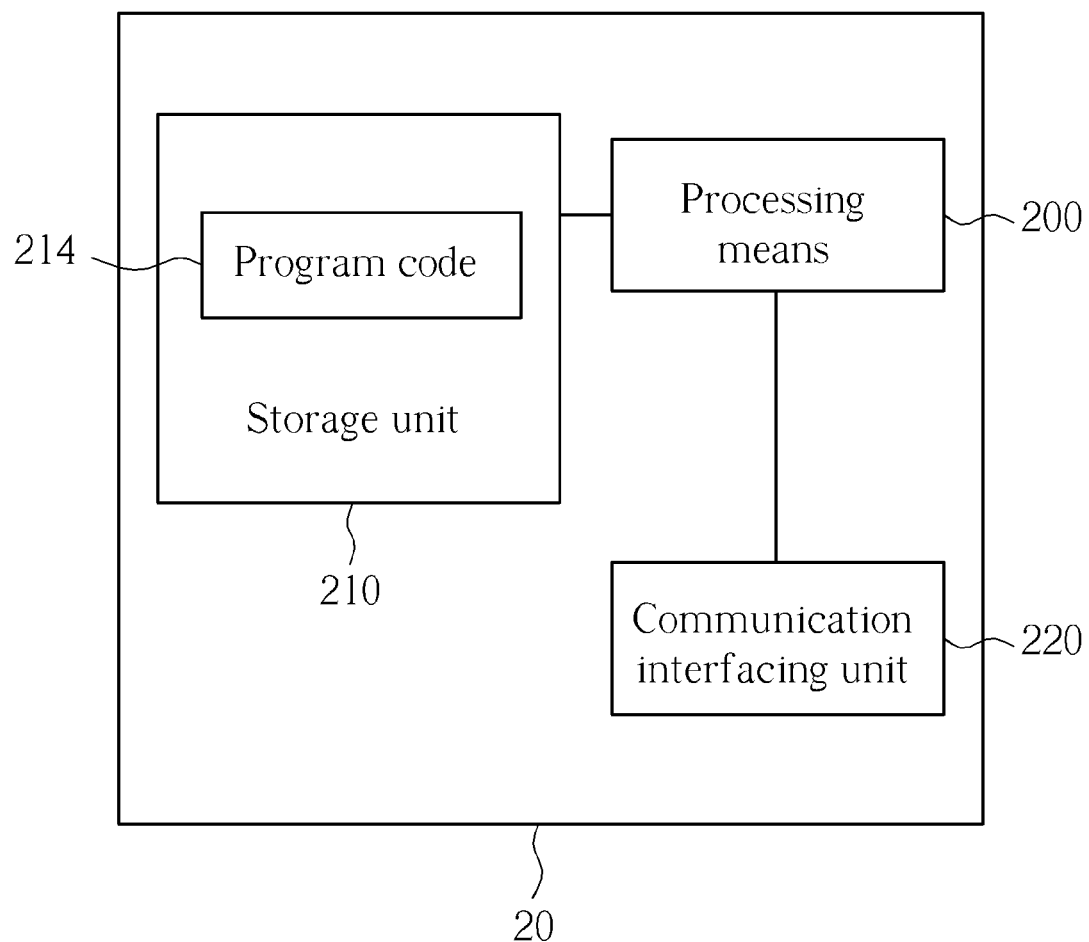
FIG. 2 is a schematic diagram of an exemplary communication device according to an embodiment.

FIG. 2 illustrates a schematic diagram of an exemplary communication device 20. The communication device 20 can be the mobile device 10 or a network (e.g. the base station) shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), flash memory, random-access memory (RAM), CD-ROMs, magnetic tape, hard disk, and optical data storage device. The communication interfacing unit 220 is preferably a radio transceiver and can exchange wireless signals with the network according to processing results of the processing means 200.

Figure 3:
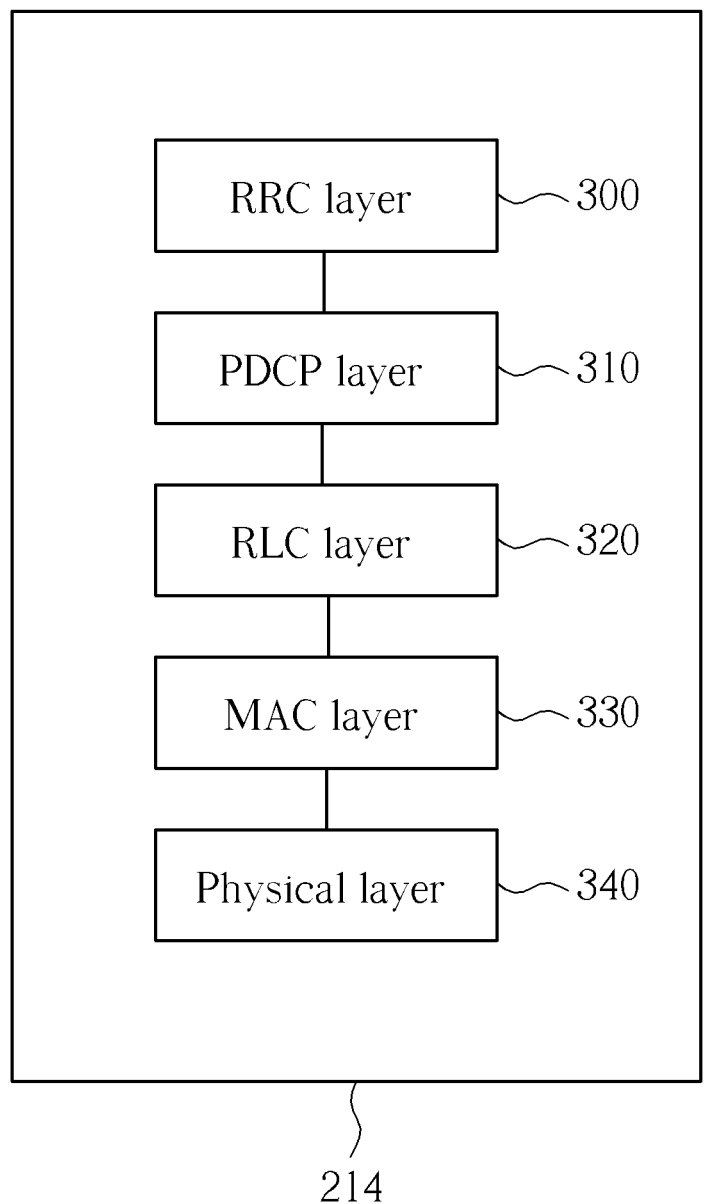
FIG. 3 illustrates a schematic diagram of communication protocol layers for an exemplary communication system.

Please refer to FIG. 3, which illustrates a schematic diagram of communication protocol layers for the LTE system. The behaviors of some of the protocol layers may be defined in the program code 214 and executed by the processing means 200. The protocol layers from top to bottom are a radio resource control (RRC) layer 300, a packet data convergence protocol (PDCP) layer 310, a radio link control (RLC) layer 320, a medium access control (MAC) layer 330 and a physical (PHY) layer 340. The RRC layer 300 is used for performing broadcast, paging, RRC connection management, measurement reporting and control, and radio bearer (RB) control responsible for generating or releasing radio bearers (RBs).

Figure 4:
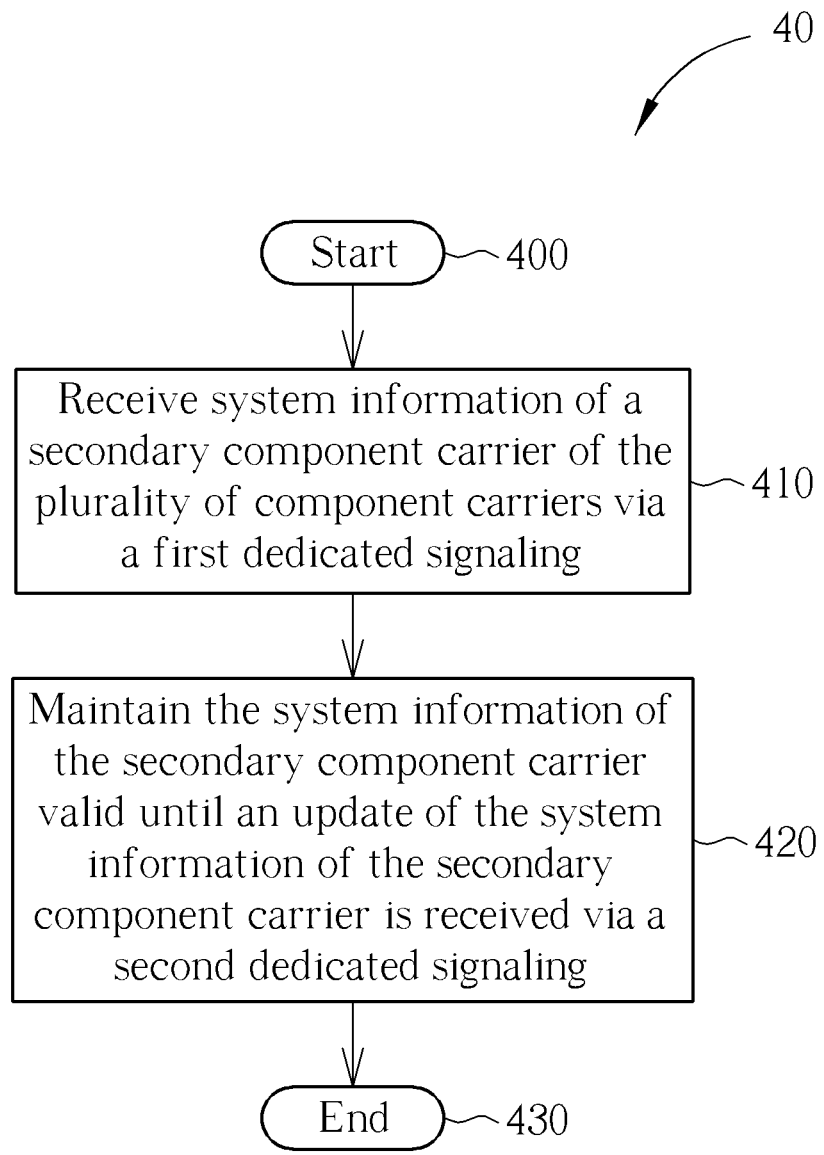
FIG. 4 is a flowchart of an exemplary process according to a first embodiment.

Please refer to FIG. 4, which illustrates a flowchart of an exemplary process 40. The process 40 is utilized in an UE (as the mobile device 10 of FIG. 1) capable of receiving and transmitting on a plurality of component carriers for handling system information reception. The process 40 can be compiled into the program code 214 and includes the following steps:

Step 400: Start.

Step 410: Receive system information of a secondary component carrier of the plurality of component carriers via a first dedicated signaling.

Step 420: Maintain the system information of the secondary component carrier valid until an update of the system information of the secondary component carrier is received via a second dedicated signaling.

Step 430: End.

According to the process 40, the UE maintains the received system information of the secondary component carrier valid even after the valid period (i.e. three hours pass), until the update of the system information of the secondary component carrier is received. In a word, the UE does not take the valid period into consideration, and determines that the received system information of the secondary component carrier is valid before the update of the system information of the secondary component carrier is received.

Referring back to FIG. 1, let's take an example associated with the system information reception based on the concept of the process 40. Assume the component carrier cc#1 is a primary component carrier, whereas the component carrier cc#2 is a secondary component carrier. In addition, a length of the valid period is three hours. The UE actively receives system information of the component carrier cc#1 via a broadcast signaling (namely the UE autonomously reads system information of the primary component carrier broadcasted by a network) and passively receives system information of the component carrier cc#2 via a first dedicated signaling transmitted by the network (e.g. the base station B2). The UE considers the system information of the component carrier cc#1 as valid for three hour, and automatically reads system information broadcasted on the component carrier cc#1 for updating the system information of the component carrier cc#1. On the contrary, the UE considers the system information of the component carrier cc#2 as valid until an update of the system information of the component carrier cc#2 is received via a second dedicated signaling transmitted by the network. In other words, if the UE does not receive any update of the system information of the component carrier cc#2 for more than three hours, the UE still considers that the system information of the component carrier cc#2 is valid.

On the other hand, the UE may be configured changing the secondary component carrier to be a primary component carrier by the network with a command. In this situation, the UE maintains the received system information of the secondary component carrier valid only during the valid period. For example, when the UE receives a RRC message (e.g. "RRC-ConnectionReconfiguration" message) for changing the component carrier #cc2 to be a primary component carrier, the UE considers that the system information of the component carrier cc#2 is valid for three hours. To realize the above-mentioned method, the UE may start a timer with three hours value. After the timer expires (i.e. three hours pass), the UE considers that the system information of the component carrier cc#2 is invalid.

Based on the concept of the process 40, the UE under carrier aggregation maintains system information of a secondary component carrier valid until an update of the system information of the secondary component carrier is received via a dedicated signaling, so as to avoid that the UE does not have valid system information of the secondary component carrier after the valid period.

Figure 5:
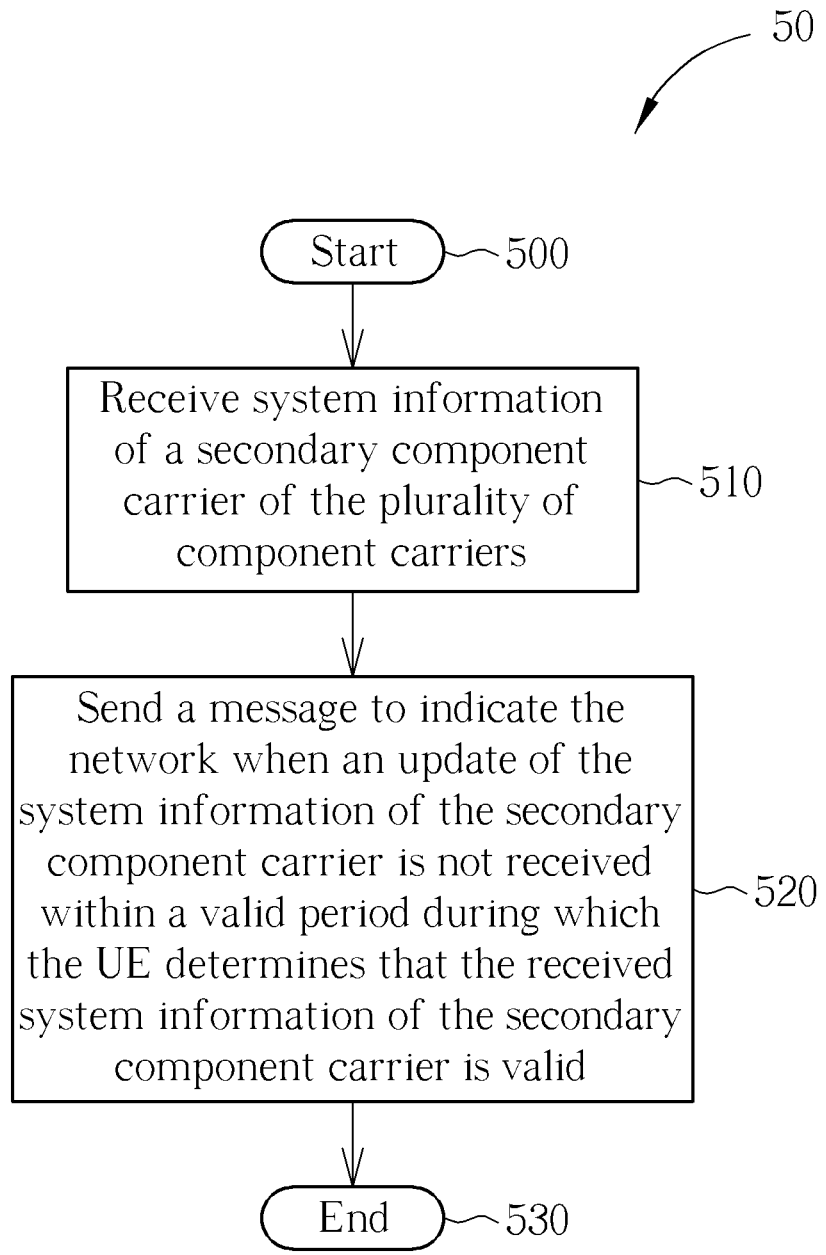
FIG. 5 is a flowchart of an exemplary process according to a second embodiment.

Please refer to FIG. 5, which illustrates a flowchart of a process 50 according to an example of the present application. The process 50 is utilized in an UE (as the mobile device 10 of FIG. 1) capable of receiving and transmitting on a plurality of component carriers for handling system information reception. The process 50 can be compiled into the program code 214 and includes the following steps:

Step 500: Start.

Step 510: Receive system information of a secondary component carrier of the plurality of component carriers.

Step 520: Send a message to indicate the network when an update of the system information of the secondary component carrier is not received within a valid period during which the UE determines that the received system information of the secondary component carrier is valid.

Step 530: End.

According to the process 50, the UE sends the message to indicate the network if the UE does not receive any update of the system information of the secondary component carrier within the valid period, so that the network sends an update of the system information of the secondary component carrier to the UE when receiving the message.

Take an example based on the process 50. The UE receives system information of the component carrier cc#2 via a first dedicated signaling from the network. The UE considers that the system information of the component carrier cc#2 is valid for three hours. After three hours, if the UE does not receive any update of the system information of the component carrier cc#2, the UE notifies the network with a RRC message, and thereby the network sends a second dedicated signaling for updating the system information of the component carrier cc#2, to the UE.

Based on the concept of the process 50, the UE under carrier aggregation autonomously notifies the network to update system information of a secondary component carrier, so as to avoid that the UE has no valid system information after the valid period.

Figure 6:
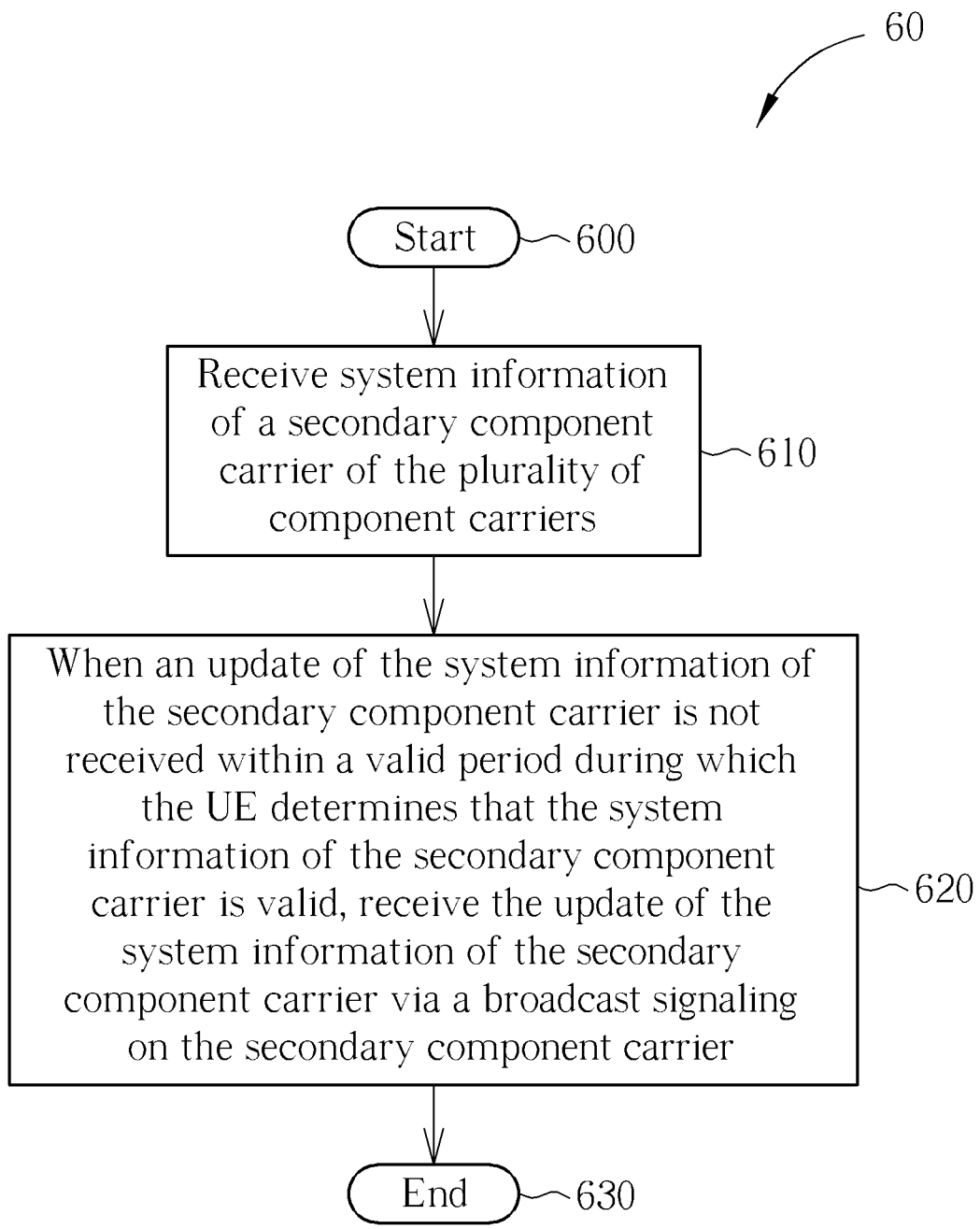
FIG. 6 is a flowchart of an exemplary process according to a third embodiment.

Please refer to FIG. 6, which illustrates a flowchart of a process 60 according to an example of the present application. The process 60 is utilized in an UE (as the mobile device 10 of FIG. 1) capable of receiving and transmitting on a plurality of component carriers for handling system information reception. The process 60 can be compiled into the program code 214 and includes the following steps:

Step 600: Start.

Step 610: Receive system information of a secondary component carrier of the plurality of component carriers.

Step 620: When an update of the system information of the secondary component carrier is not received within a valid period during which the UE determines that the system information of the secondary component carrier is valid, receive the update of the system information of the secondary component carrier via a broadcast signaling on the secondary component carrier.

Step 630: End.

According to the process 60, if the UE does not receive any update of the system information of the secondary component carrier within the valid period, the UE receives the update of the system information of the secondary component carrier via the broadcast signaling.

Take an example based on the process 60. The UE receives system information of the component carrier #2 via a dedicated signaling from the network. When the UE does not receive an update of the system information of the component carrier cc#2 in three hours, the UE autonomously reads the system information of the component carrier cc#2 from a broadcast signaling on the component carrier cc#2, thereby obtaining the update of the system information of the component carrier cc#2, so as to avoid that the UE does not have valid system information of the secondary component carrier after the valid period.

Figure 7:
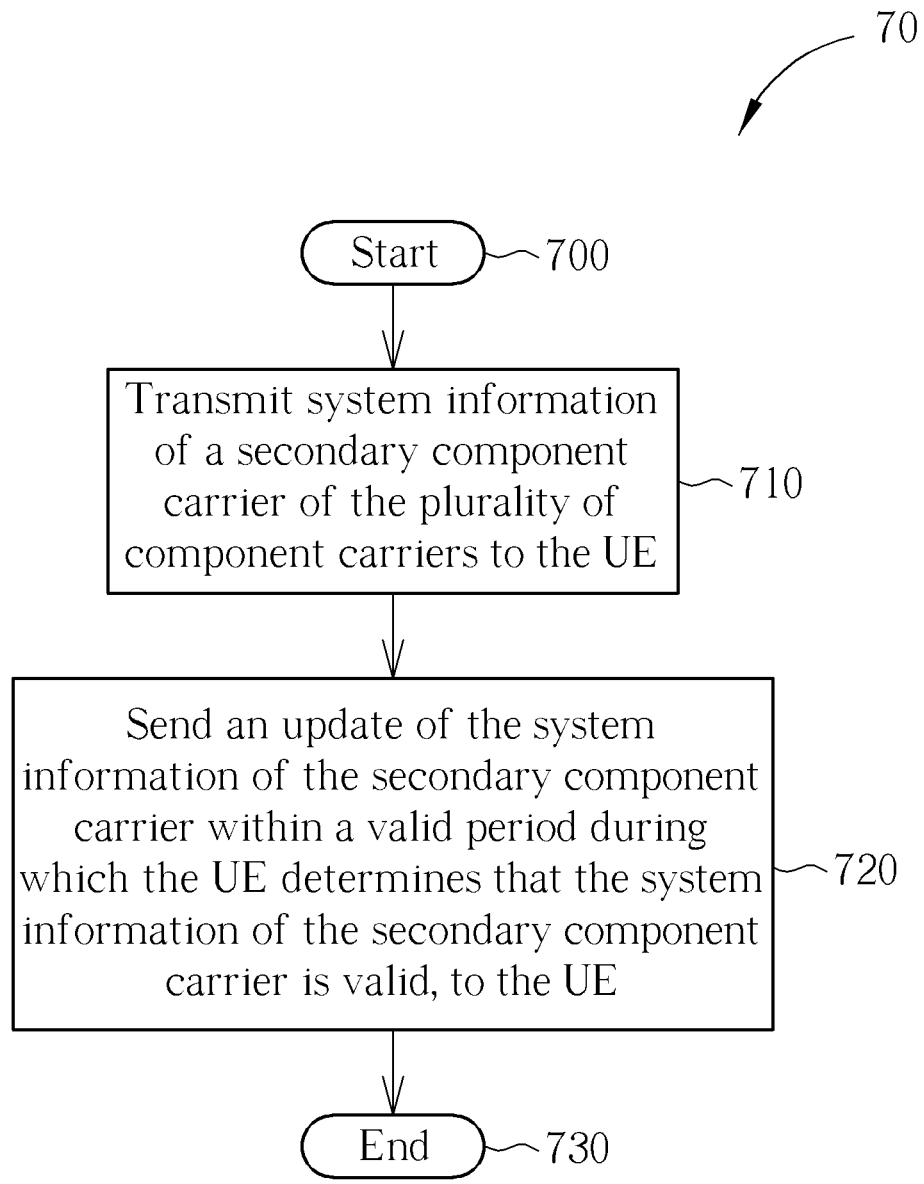
FIG. 7 is a flowchart of an exemplary process according to a fourth embodiment.

Please refer to FIG. 7, which illustrates a flowchart of a process 70 according to an example of the present application. The process 70 is utilized in a network for handling system information reception. The process 70 can be compiled into the program code 214 and includes the following steps:

Step 700: Start.

Step 710: Transmit system information of a secondary component carrier of the plurality of component carriers to the UE.

Step 720: Send an update of the system information of the secondary component carrier within a valid period during which the UE determines that the system information of the secondary component carrier is valid, to the UE.

Step 730: End.

According to the process 70, the network automatically sends the update of the system information of the secondary component carrier to the UE within the valid period, so that the UE has valid system information for update after the valid period.

Take an example based on the process 70. The UE receives system information of the component carrier cc#2 via a first dedicated signaling from the network. On the other hand, the network starts a timer with three hours value when sending the first dedicated signaling to the UE, and sends a second dedicated signaling for updating the system information of the component carrier cc#2 to the UE before the timer expires. Thus, the UE receives the update of the system information of the component carrier cc#2 before the system information of the component carrier cc#2 is invalid.

Figure 8:
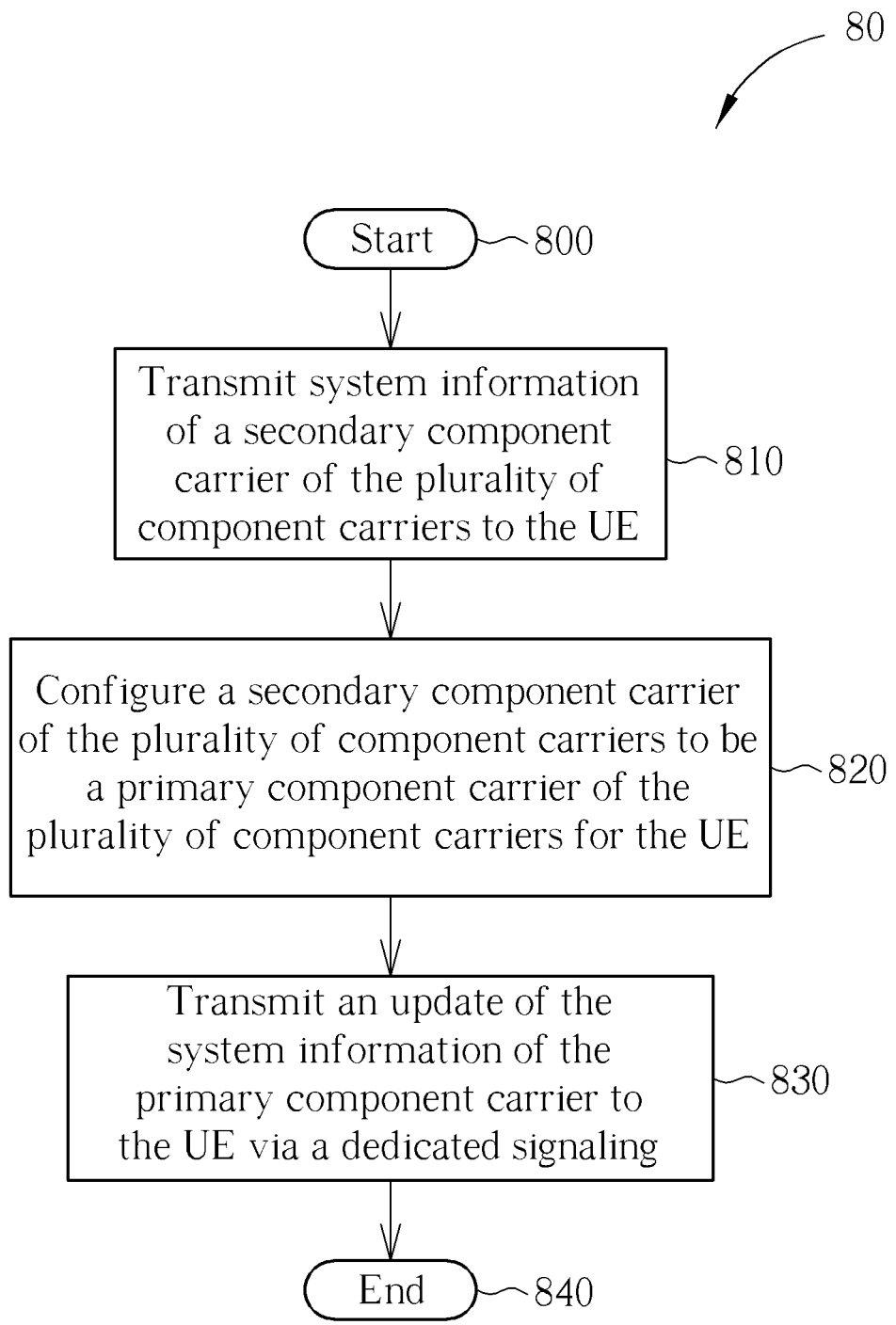
FIG. 8 is a flowchart of an exemplary process according to a fifth embodiment.

Please refer to FIG. 8, which illustrates a flowchart of a process 80 according to an example of the present application. The process 80 is utilized in a network for handling system information reception. The process 80 can be compiled into the program code 214 and includes the following steps:

Step 800: Start.

Step 810: Transmit system information of a secondary component carrier of the plurality of component carriers to the UE.

Step 820: Configure a secondary component carrier of the plurality of component carriers to be a primary component carrier of the plurality of component carriers for the UE.

Step 830: Transmit an update of the system information of the primary component carrier to the UE via a dedicated signaling.

Step 840: End.

According to the process 80, when the secondary component carrier is changed to be the primary component carrier, the network sends the dedicated signaling for updating the system information of the primary component carrier to the UE. In other words, when the secondary component carrier is changed to be the primary component carrier, the UE does not receive the system information of the primary component carrier via a broadcast signaling transmitting the system information.

Note that, the dedicated signaling is a RRC message (e.g. the "RRCConnectionReconfiguration" message) including information element containing the system information, or a new RRC message containing the system information. In addition, the system information of the primary component carrier is at least one of MasterInformationBlock (MIB), SystemInformationBlockType1 (SIB1), and SystemInformationBlockType2 (SIB2), or information elements in at least one of MIB, SIB1 and SIB2.

Take an example based on the process 80. The UE receives system information of the component carrier cc#2 (namely a secondary component carrier) via a first dedicated signaling from the network. On the other hand, the network configures changing the component carrier cc#2 to be a primary component carrier. After that, the network sends an update of the system information of the component carrier cc#2 via a second dedicated signaling. In other words, the UE receives the second dedicated signaling for updating the system information of the component carrier cc#2 (namely a primary component carrier).

Based on the concept of the process 80, when a secondary component carrier is changed to be a primary component carrier, the UE knows how to obtain system information of a primary component carrier for system information update.

Figure 9:
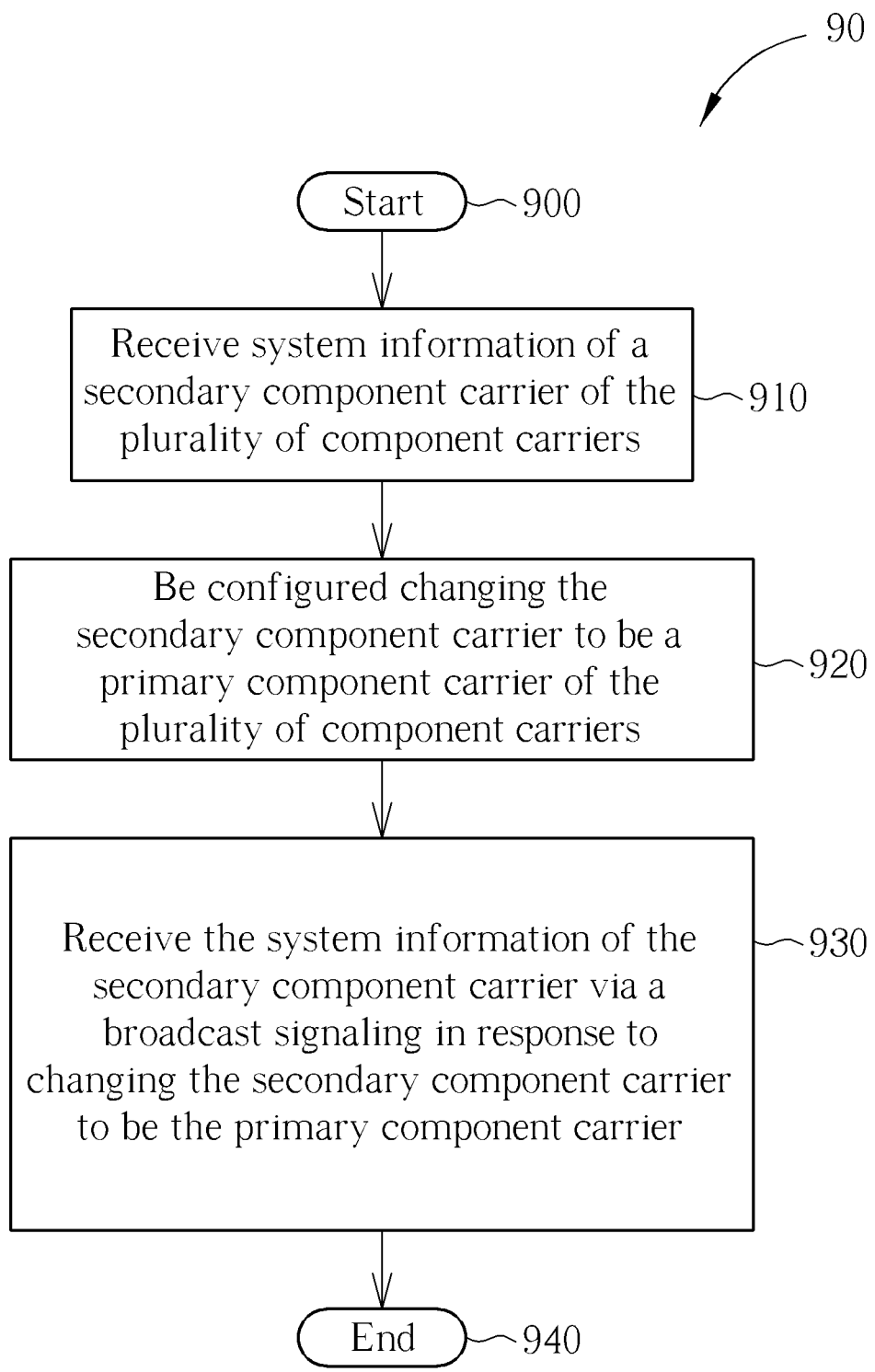
FIG. 9 is a flowchart of an exemplary process according to a sixth embodiment.

Please refer to FIG. 9, which illustrates a flowchart of a process 90 according to an example of the present application. The process 90 is utilized in an UE (as the mobile device 10 of FIG. 1) capable of receiving and transmitting on a plurality of component carriers for handling system information reception. The process 90 can be compiled into the program code 214 and includes the following steps:

Step 900: Start.

Step 910: Receive system information of a secondary component carrier of the plurality of component carriers.

Step 920: Be configured changing the secondary component carrier to be a primary component carrier of the plurality of component carriers.

Step 930: Receive the system information of the secondary component carrier via a broadcast signaling in response to changing the secondary component carrier to be the primary component carrier.

Step 930: End.

According to the process 90, when the secondary component carrier is changed to be the primary component carrier, the UE receives the system information of the secondary component carrier (new primary component carrier) via the broadcast signaling.

Take an example based on the process 90. The UE receives system information of the component carrier cc#2 via a dedicated signaling from the network. The network configures changing the component carrier cc#2 to be a primary component carrier. After that, the UE determines whether a first value tag (e.g. "SystemInfoValueTag") included in the system information of the secondary component received via the dedicated signaling is different from a second value tag included in the system information received via a broadcast signaling. If the UE determines the first value tag is different from the second value tag (namely the received system information of the secondary component carrier is different from system information transmitted by the broadcast signaling), the UE receives the system information of the component carrier cc#2 (namely the new primary component carrier) via the broadcast signaling.

Based on the concept of the process 90, when a secondary component carrier is changed to be a primary component carrier, the UE knows how to obtain system information of a primary component carrier. The UE receives the system information of the primary component carrier via a broadcast signaling instead of a dedicated signaling.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary examples and means are provided for handling system information reception for the UE and/or network, so as to correctly perform system information update for a secondary component carrier/primary component carrier.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling system information reception for a mobile device capable of receiving and transmitting on a plurality of component carriers in a wireless communication system, the method comprising:
   receiving system information of a secondary component carrier of the plurality of component carriers via a first dedicated signaling;
   maintaining the system information of the secondary component carrier valid until an update of the system information of the secondary component carrier is received via a second dedicated signaling; and
   maintaining the system information of the secondary component carrier valid after a valid period during which the mobile device determines that the received system information of the secondary component carrier is valid;
   wherein the mobile device does not receive any update of the system information of the secondary component carrier for more than the valid period, and the mobile device still considers that the system information of secondary component carrier is valid.

2. The method of claim 1 further comprising:
   being configured changing the secondary component carrier to be a primary component carrier of the plurality of component carriers by the network;
   starting a timer with a length of the valid period; and
   determining that the system information of the secondary component carrier is invalid when the timer expires.

3. A method of handling system information reception for a mobile device capable of receiving and transmitting on a plurality of component carriers in a wireless communication system, the method comprising:
   receiving SYStCII1 information of a secondary component carrier of the plurality of component carriers; and
   maintaining the system information of the secondary component carrier valid after a valid period during which the mobile device determines that the received system information of the secondary component carrier is valid; and
   the mobile device sending a message to indicate the network to update of the system information of the secondary component carrier when an update of the system of the secondary component carrier is not received within a valid period during which the mobile device determines that the received system information of the secondary component carrier is valid.

4. The method of claim 3, wherein sending the message to indicate the network when the update of the system information of the secondary component carrier is not received within the valid period during which the mobile device determines that the system information of the secondary component carrier is valid comprises:
   determining that the system information of the secondary component carrier is valid during the valid period; and
   sending the message to indicate the network when the update of the system information of the secondary component carrier is not received within the valid period.

5. A method of handling system information reception for a mobile device capable of receiving and transmitting on a plurality of component carriers in a wireless communication system, the method comprising:
   receiving system information of a secondary component carrier of the plurality of component carriers;
   maintaining the system information (Irthe secondary component carrier valid after a valid period during which the mobile device determines that the received system information of the secondary component carrier is valid: and
   when an update of the system information of the secondary component carrier not received within a valid period during which the mobile device determines that the system information of the secondary component carrier is valid, receiving the update of the system information of the secondary component carrier via a broadcast signaling on the secondary component carrier.

6. A method of handling system information reception for a network in a wireless communication system comprising a mobile device capable of receiving and transmitting on a plurality of component carriers, the method comprising:
   transmitting system information of a secondary component carrier of the plurality of component carriers to the mobile device; via a first dedicated signaling;
   maintaining the system information of the secondary component carrier valid after a valid period during which the mobile device determines that received system information of the secondary component carrier is valid; and
   sending an update of the system information of the secondary component carrier via a second dedicated signaling within a valid period during which the mobile device determines that the system information of the secondary component carrier is valid, to the mobile device.

7. The method of claim 6, wherein sending the update of the system information of the secondary component carrier within the valid period during which the mobile device determines that the system information of the secondary component carrier is valid, to the mobile device comprises:
  starting a timer with a length of the valid period when transmitting the system information of the secondary component carrier to the mobile device; and
  sending the update of the system information of the secondary component carrier when the timer expires.

8. A method of handling system information reception for a network in a wireless communication system comprising a mobile device capable of receiving and transmitting on a plurality of component carriers, the method comprising:
  transmitting system information of a secondary component carrier of the plurality of component carriers to the mobile device;
  maintaining the system information of the secondary component carrier valid after a valid period during which the mobile device determines that received system information of the secondary component carrier is valid;
  configuring a secondary component carrier of the plurality of component carriers to be a primary component carrier of the plurality of component carriers for the mobile device; and
  transmitting system information of the primary component carrier to the mobile device with a signaling dedicated for transmitting system information of the secondary component carrier.

9. The method of claim 8, wherein the signaling is a radio resource control (RRC) message including information element (IE) containing the system information of the secondary component carrier, or a new RRC message containing the system information of the secondary component carrier.

10. The method of claim 8, wherein the system information of the primary component carrier is at least one of MasterInformationBlock (MIB), SystemInformationBlockType1 (SIB1), and SystemInformationBlockType2 (SIB2), or information elements in at least one of MIB, SIB1 and SIB2.

11. A method of handling system information reception for a mobile device capable of receiving and transmitting on a plurality of component carriers in a wireless communication system, the method comprising:
  receiving system information of a secondary component carrier of the plurality of component carriers;
  maintaining the system information of the secondary component carrier valid alter a valid period during which the mobile device determines that the received system information of the secondary component carrier is valid;
  being configured changing the secondary component carrier to be a primary component carrier of the plurality of component carriers; and
  receiving the system information of the secondary component carrier via a broadcast signaling in response to changing the secondary component carrier to be the primary component carrier.

12. The method of claim 11, wherein receiving the system information of the secondary component carrier via the broadcast signaling in response to changing the secondary component carrier to be the primary component carrier comprises:
  when the system information of the secondary component carrier is different from system information transmitted by the broadcast signaling on the primary component carrier, receiving the system information of the secondary component carrier via the broadcast signaling in response to changing the secondary component carrier to be the primary component carrier.

13. The method of claim 12, wherein when the system information of the secondary component carrier is different from the system information transmitted by the broadcast signaling on the primary component carrier, receiving the system information of the secondary component carrier via the broadcast signaling in response to changing the secondary component carrier to be the primary component carrier comprises:
  receiving the system information of the secondary component carrier via the broadcast signaling in response to changing the secondary component carrier to be the primary component carrier when a first value tag included in the system information of the secondary component is different from a second value tag included in the system information transmitted by the broadcast signaling.

* * * * *